Oct. 25, 1966
J. F. DONNELLY ETAL
3,280,701
OPTICALLY VARIABLE ONE-WAY MIRROR
Original Filed Sept. 5, 1961
2 Sheets-Sheet 1
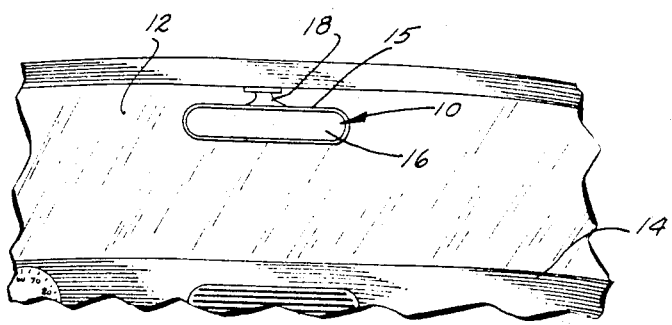
Fig. 1
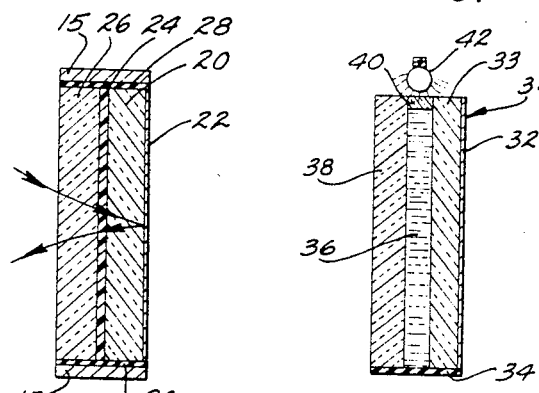
Fig. 2
Fig. 3
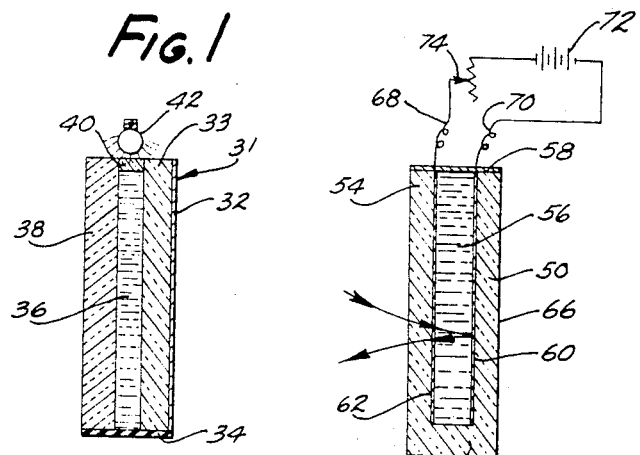
Fig. 4
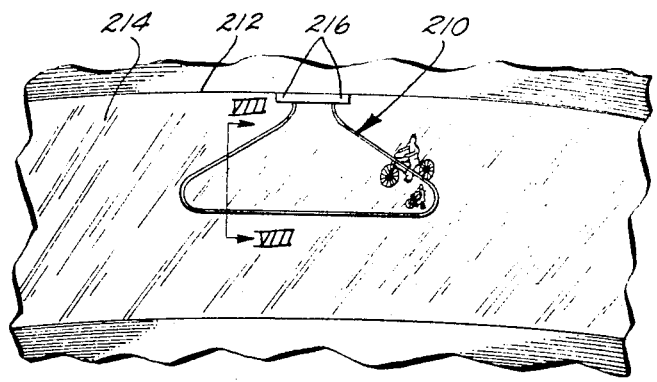
Fig. 5
INVENTOR.
JOHN F. DONNELLY
RICHARD C. COOPER
BY
*Price & Heneveld*
ATTORNEYS Oct. 25, 1966   J. F. DONNELLY ETAL   3,280,701
OPTICALLY VARIABLE ONE-WAY MIRROR
Original Filed Sept. 5, 1961                2 Sheets-Sheet 2

INVENTOR.
JOHN F. DONNELLY
RICHARD C. COOPER
BY
*Price & Heneveld*
ATTORNEYS

UNITED STATES PATENT OFFICE 3,280,701
Patented Oct. 25, 1966

3,280,701
OPTICALLY VARIABLE ONE-WAY MIRROR
John Fenlon Donnelly, Holland, and Richard C. Cooper, Ada, Mich., assignors to Donnelly Mirrors, Inc., Holland, Mich., a corporation of Michigan
Original application Sept. 5, 1961, Ser. No. 135,892. Divided and this application June 7, 1965, Ser. No. 477,623
2 Claims. (Cl. 88—77)

This application is a divisional application of the parent application now abandoned entitled Mirror For Vehicles, filed September 5, 1961, Serial No. 135,982 by John F. Donnelly and Richard C. Cooper.

This invention relates to mirrors, especially rear view mirrors for vehicles, and more particularly to mirrors having variable optical characteristics.

It is well-known to every automobile driver that clear observance of pedestrians, bicycle riders, and other vehicles depends to a great extent upon the characteristics of his rear view mirror. Since this small item is relied upon so heavily, its optical characteristics should be completely dependable in all types of surroundings normally encountered. These varying surroundings include a great variety of lighting variations and traffic conditions. Any one of such light variations, e.g. glare of bright lights of a following automobile, bright sunshine, blackness of night, evening twilight, or the like, may be coupled with any of many traffic conditions such as bumper-to-bumper traffic, presence of many pedestrians and bicycle riders, crossing of dark intersections, multi-lane interweaving traffic, and so forth.

Heretofore, efforts have been expended to aid the driver by producing rear view mirrors capable of reducing glare, e.g. with tinted mirrors; or capable of adapting to alternate darkness and bright lights, e.g. the two or three position, mechanical flip-flop mirrors. Such devices are certainly useful, but do not cause mirrors to be capable of adapting to all types of situations. Consequently, there has existed a great need for a mirror allowing the control of the reflectivity of brightness over a wide range of values to accommodate the particular optical characteristics of the situation.

Another design limitation encountered with present mirrors is that any increase in the dimensions of the mirrors to enlarge the rear vision causes a proportionate decrease in the forward vision by enlarging the "blind spot" caused by the mirror. There exists a need for a mirror subject to driver-control to provide improved rear vision without causing a larger "blind spot." This mirror should also have a variable reflectivity to accommodate various lighting conditions as well as various traffic conditions.

It is therefore an object of this invention to provide a mirror that solves the above cited problems to increase the safety of drivers, pedestrians, bicycle riders and others. The invention provides a mirror that has variable optical characteristics capable of adjusting automatically, or subject to driver control to adjust to lighting variations and traffic variations encountered.

It is another object of this invention to provide a mirror structure that enables a very large rear view mirror to be used in vehicles since the blind spot in forward vision may be removed at the driver's desire. The invention provides a mirror in which the inconsistent characteristics of transparency and reflectivity may be alternated. The mirror may include both features of reflectivity brightness and alternate variable transparency-reflectivity, and thus is completely adaptable to varying lighting conditions and traffic conditions.

These and other objects of this invention will be apparent upon studying the following specification in conjunction with the drawings, in which:

FIG. 1 is a fragmentary elevational view of one embodiment of the inventive rear view mirror mounted adjacent of an automobile windshield;

FIG. 2 is a side sectional elevational view of one form of the first embodiment of the inventive mirror;

FIG. 3 is a side elevational sectional view of a modified and second form of the first embodiment;

FIG. 4 is a side elevational sectional view of a further modified and third form of the first embodiment of the mirror;

FIG. 5 is a fragmentary elevational view showing the second embodiment of the novel rear view mirror mounted in an automobile and being in its transparent state;

Figure 6:
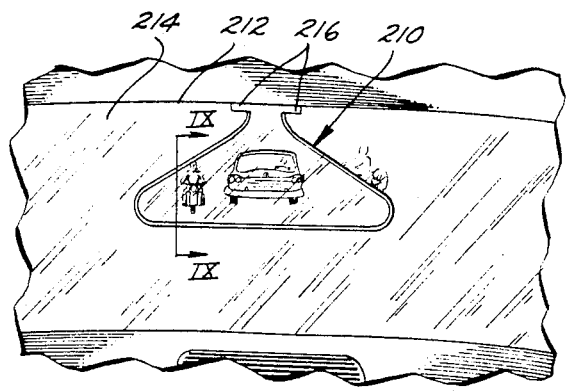
FIG. 6 is a fragmentary elevational view of the mirror as illustrated in FIG. 7 in its reflective state.

Basically, this invention comprises a mirror, especially an automobile rear view mirror, having variable optical characteristics. The mirror includes adjacent the reflective surface a layer having a variable transparency responsive to an energy potential applied. In one embodiment of the invention, the variable transparency (i.e. variable opacity) substance is in front of the reflective mirror surface, and is preferably variable in color, to cause variations in light reflectance from the mirror surface.

In a second embodiment of the invention, the variable transparency or variable opacity substance is behind a one-way mirror surface such that said mirror is transparent when said substance is transparent and is reflective when said substance is relatively opaque.

In the third form of the invention, the mirror includes a variable transparency substance in front of the reflective surface to allow control of the reflectivity brightness, and a variable transparency substance behind the surface to allow the mirror to be adaptable to various types of lighting and traffic conditions.

FIRST EMBODIMENT

Referring now to FIG. 1, in the form of the invention there illustrated, mirror 10 is mounted adjacent the windshield 12 and above the dashboard 14 of an automobile as by attachment to the top of the windshield frame. The mirror 10 includes reflecting surface 16, a mounting means 18 and a suitable frame 15 as desired. The reflecting surface 16 has a variable brightness reflectivity depending upon the lighting conditions involved. This is preferably accomplished by changing the color of a substance adjacent the reflecting surface, such that glare will be filtered out, but only sufficient filtering will occur to remove objectionable light without causing poor resolution of the object lines. This change is responsive to an energy potential applied to the mirror. The energy may be in the form of light, heat, or electrical potential. The heat may be radiant, conductive, or created in the mirror by converted light. The mirror includes a substance responsive to the particular form of energy used to vary in transparency, i.e. in opaqueness. Such color-changing substances are often called phototropic in the art. This invention, however, may in its broadest aspects utilize materials not normally termed phototropic. For example, in the second embodiment of this invention, materials changing in opacity by converting from a sol to a gel state and visa versa, may be used as well as color-changing materials. I.e., the particular substances used in the variable reflectance mirror may be varied as well as the concentration thereof and the type and amount of energy applied to produce the desired mirror.

FIRST FORM OF FIRST EMBODIMENT

In the first structure of the invention illustrated in FIG. 2, a transparent plate 20 made e.g. of glass supports a conventional mirror surface 22 formed of a deposited metal film such as aluminum, chromium, silver, etc. in a conventional manner. Light rays transmitted to the glass 20 will thus reflect from surface 22 back through the glass 20 again. The color changeable material may be embodied in layer 24 sandwiched between glass layer 20 and a second glass layer 26. The color changing material could be a dye which will reversibly change color when subjected to light energy, for example. Such dyes would include victoria blue, brilliant green, crystal violet, malachite green, luco bases of pararosaniline and others. One method of obtaining the film to form this layer is to add one part of victoria blue and one part of malachite green to approximately 200 parts of hot water, and preferably add one part of potassium cyanide as a catalyst of the reversing action. The precipitation resulting from this mixture is filtered and washed with hot water containing potassium cyanide. It may then be dissolved in 20 parts of an 85% methyl alcohol aqueous solution. To this added 10 parts of polyvinyl butyraldehyde acetal and 3 parts of polyglycol butyl ether. A film is then formed of this material by pouring it upon a flat surface and drying. This film is sandwiched between the glass plates 24 and 26. Suitable seals 28 and 30 may be provided on the top and bottom and on the ends of the mirror inside the frame. The resulting mirror is reversibly activated by light. I.e. as the light intensity increases, the color of the mirror gradually changes from a very light and almost colorless shade to a dark bluish-green. Thus, for example, if driving at night, the rear view mirror remains a light color to allow clear vision behind. When an automobile with bright lights follows closely, the intensity of the lights will cause the mirror to respond and become darkened to the proper extent to filter out undesirable glare. Such a mirror is calibrated previously to respond to the various light intensity levels and give the proper reflectivity brightness.

Instead of the mixture of malachite green and victoria blue dyestuffs mentioned above, only malachite green may be used if desired and prepared substantially as follows: 1 part of malachite green is dissolved in approximately 90 to 100 parts of water. A small amount of potassium cyanide catalyst is added. The precipitate resulting is filtered off and washed with hot water containing potassium cyanide. This precipitate is dried and three parts of it are dissolved in a solution of 50 parts polyvinyl butyraldehyde acetal, 50 parts of methyl alcohol and 10 parts of diacetone alcohol. Again, this material is poured out upon a flat sheet and dried to form a film. It is then sandwiched between glass plates. The resulting product acts substantially as the one described above but possesses different color hues.

Instead of forming an independent film and then sandwiching it between glass plates, it may be desired to form the film directly upon the face of one of the glass sheets. Alternatively, other transparent materials besides glass may be used in certain instances, such as polymethyl methacrylate. Also, instead of the polyvinyl butyraldehyde acetal resin mentioned above to form film matrix for the light responsive material, other resins may be used. Possible alternatives are polyvinyl alcohol partially acetalized with butyraldehyde, or methylcellulose.

SECOND FORM OF FIRST EMBODIMENT

Instead of the mirror being automatically responsive to incident light, as with the headlights of a following automobile, it may be desired to provide a variable reflectivity mirror controllable by the driver at his discretion. Referring to FIG. 3, mirror 31 includes glass plate 33 with reflecting mirror surface 32 on the back. The bottom of the mirror is sealed at 34 as are both ends (not shown) to form a chamber 36 between glass plate 33 and glass plate 38. This chamber may be filled with a suitable liquid, light-responsive, color-changing material. A plug 40 at the top of a light-transmitting material may be used to close the chamber. Mounted adjacent the mirror is a high intensity energy source 42. The color-changing liquid in chamber 36 is calibrated to be responsive only to this energy source. Such a liquid might, for example, be a solution of potassium ferrocyanide containing a small amount of phenolphthalein indicator. Such an aqueous solution is yellow in the dark or when exposed to low light intensity, but gradually becomes dark pink when exposed to light of increasing intensity. The yellow color returns when the solution is again placed in the dark. By using a dilute solution of potassium ferrocyanide, such a material will not be sensitive to lights of approaching automobiles or daylight but may be closely regulated with the high intensity source 42. A conventional rheostat may be used to vary the electrical power to source 42 to enable the driver to control the light intensity and provide a range of color shades in chamber 36. This allows control of the reflectivity brightness from mirror surface 32. Instead of liquid, a solid film as described previously may be used here also.

Instead of the particular light-responsive substance mentioned, a substance responsive to heat or temperature changes may be utilized. Thus, by making source 42 a radiant heat source, color control could be maintained. An example is a solution of cobalt chloride container 6 waters of hydration dissolved in ethyl alcohol, and containing a small amount of water to control the pink-to-blue color change point. Such a solution is obtained by the addition of 8 grams of cobalt chloride to 100 cc. of ethyl alcohol having a specific gravity of about 0.8. The amount of water may be approximately 10 cc., but can be varied say from 5 to 15 cc. to control the color change point. Upon energizing source 42, to apply radiant heat to this solution, the material will change from light pink to a bluish color. The cobalt chloride solution may be embodied in a resin matrix by adding polyvinyl butyraldehyde acetal and drying to a film. This can be sandwiched between glass sheets as indicated previously.

Instead of applying radiant heat directly to these heat or temperature-responsive materials, a light source may be used, in combination with a separate substance embedded in the film or dissolved in the solution which is capable of converting light to heat. Examples are various ferrous compounds, nickel salts, or cobalt salts, as well as certain organic materials, e.g. ferrous sulfate, ferroammonium sulfate, and nickel sulfate.

THIRD FORM OF FIRST EMBODIMENT

The structure illustrated in FIG. 4 employs a pair of electrical elements on opposite sides of the color-changing material layer. In this arrangement, a glass container having a back portion 50, a bottom portion 52, a front portion 54, and suitable end seals (not shown) define a chamber 56 into which a liquid light-responsive material may be placed and enclosed by a suitable cap 58. Mirror surface 60 is coated on one side of the chamber to thus serve also as an electrode, providing the liquid used does not attack it. On the opposite side of the chamber is a second electrode 62 which must be transparent to allow light to pass through glass layer 54, through solution 56, reflect from mirror surface 60, and pass back through layer 54. This electrode may for example, be a film of tin oxide, cadmium oxide, antimony oxide, cobalt oxide, zinc oxide, indium oxide, titanium oxide, chromium oxide, platinum oxide, or any other suitable transparent, conductive film. Any of the oxides may be prepared by using the bromide, chloride or acetate of the corresponding metal.

If the mirror surface 60 is not resistant to the particular substance in chamber 56, a second conductive coating like 62 may be coated in the place of mirror surface 60, with the mirror surface being coated on the outside surface 66.

The electrical potential applied across the elements is supplied through leads 68 and 70 from a suitable power source such as battery 72 controllable through a variable resistor 74. An example solution in the chamber is a 0.1 normal solution of sodium chloride, slightly acidified with hydrochloric acid, and having added thereto a few drops of phenolphthalein indicator. With the electrodes approximately 3 mm. apart, a potential of approximately 0.9 volt causes the solution to turn pink. The pink color deepens upon an increase in the potential applied. By lowering the potential again, the color lightens. This reversible action is probably due to a change in the pH of the solution in response to the E.M.F. applied. Various other indicator materials instead of phenophthalein may be utilized with the proper electrode arrangement. It should be noted that this type of pH-E.M.F. relationship involves an excess of hydrogen ions in the vicinity of the cathode and an excess of hydroxyl ions adjacent the anode. Therefore, if the particular indicator used changes between two different colors (e.g. from blue to pink) instead of from colorless to a color, a different color will be present at each electrode. Thus, in such a case one of the electrodes should be removed from the general vicinity of the mirror surface to prevent two-color interference.

An example of a substance useable in chamber 56 and having a pH variation in response to temperature change is a solution of sodium bicarbonate, diacetone alcohol, aqueous methanol, and an indicator such as phenolphthalein. Such a solution could be composed of 3 parts sodium bicarbonate, 10 parts of diaectone alcohol, 50 parts of 10% aqueous methanol solution, and ½ part of phenolphthalein.

Many other variations in the materials used, in the physical form of the substance and the like may be made in the structure illustrated in FIG. 4. The essential factor is the presence of the color-changing material in a uniformly dispersed manner over the front of the mirror surface to vary the reflectivity brightness from this mirror.

SECOND EMBODIMENT

Referring now to FIG. 5, a second embodiment of the inventive mirror is there shown. Mirror 210 is mounted adjacent the windshield 214 of an automobile as by connecting integral flanges 216 to the frame 212 above the windshield. The size of the mirror may be substantially larger than conventional rear view mirrors due to its unique characteristics which prevent it from causing a permanent "blind spot" in the windshield. The mirror may be altered between a substantially transparent nature (FIG. 5) to a substantially reflective nature (FIG. 6) at the control of the driver by manipulation of a suitable foot switch or the like. When it is transparent, the driver has clear vision of pedestrians, bicycles, approaching automobiles from side streets, etc., in front of the automobile by looking directly through the mirror (FIG. 5). When the driver causes the large mirror to become reflective, automobiles, motorcycles, etc. around the rear of the vehicle are clearly observed (FIG. 6). In other words, the large mirror provides a much wider field of effective rear vision for the driver.

Figure 7:
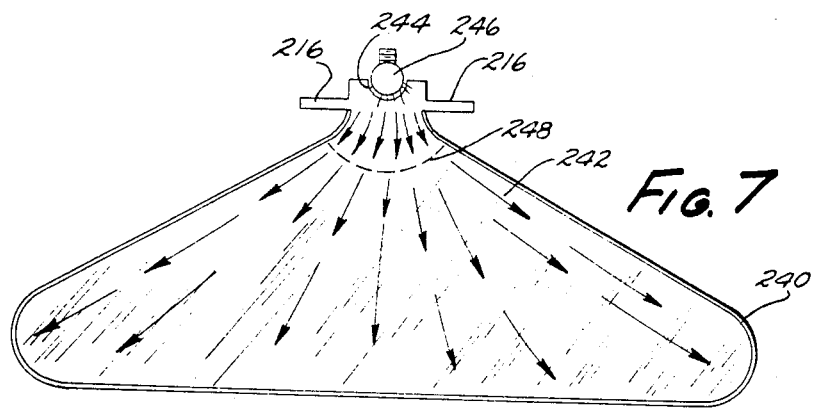
FIG. 7 is an enlarged front elevational view of the mirror illustrated in FIGS. 5 and 6 and showing in more detail the structure thereof.
Figures 8, 9, 10:
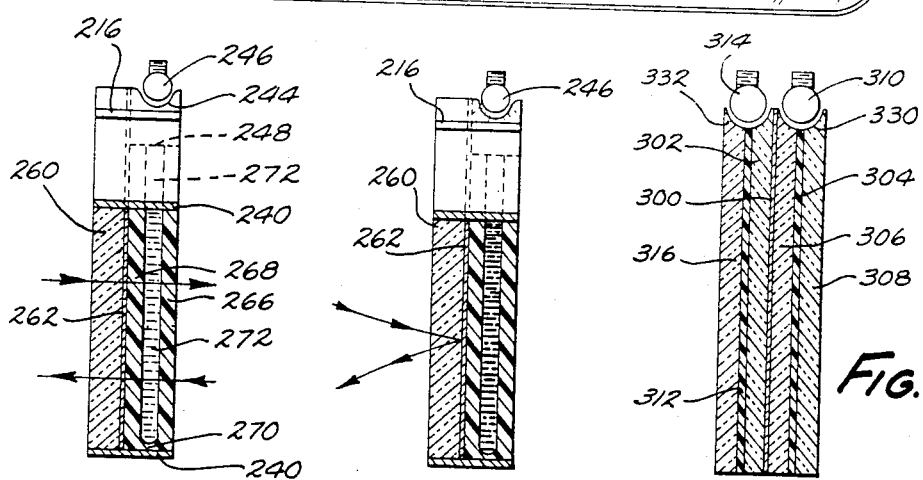
FIG. 8 is a side elevational sectional view of the mirror as illustrated in FIG. 5, and taken on plane VIII—VIII.
FIG. 9 is a side elevational sectional view of the mirror as illustrated in FIG. 6, and taken on plane IX—IX.
FIG. 10 is a side elevational sectional view of a third embodiment of the invention as possessing the combined features of the first two embodiments.

The construction of this mirror may be substantially as shown in FIG. 7. It may include a body portion 242 from which mounting flanges 216 extend. Recess 244 is provided for insertion of a suitable lightbulb or other energy transmitting source 246. A frame 240 may be attached around the periphery. The body includes a fluid chamber having an arcuate upper boundary 248. The structure is laminated to include a front glass support 260, a one-way mirror surface 262 (e.g. deposited chromium), and a light conducting, transparent layer having two spaced walls 266 and 268 connected by peripheral rim 270 to define chamber 272 therein. This chamber is filled with a variable-opacity substance responsive to an energy source to become more opaque when activated. When the material in chamber 272 is transparent, light passes through the one-way mirror surface as indicated by the arrows in FIG. 8 according to well-know principles concerning this type of mirror, i.e. it appears as a "window." However, as is conventional with one-way mirrors, when light intensity incident to the back of the one-way mirror surface 262 is relatively less than the light intensity incident to the front, the chromium surface acts as a "mirror" rather than as a "window" and reflects the light rather than transmitting it therethrough (FIG. 9).

With applicant's inventive mirror, the area behind and adjacent the one-way mirror surface 262 may be made dark or transparent to regulate the incident light intensity from outside sources on the back of surface 262 to cause it to alternatively be a "window" or a "mirror" as desired. This is done by filling chamber 272 behind the reflective surface with a light-responsive material that is reversibly opaque or transparent. FIG. 9 illustrates this material in its opaque position as activated by energy source 246. The light emitted from source 246 may, for example, be ultraviolet light to activate a mixture of water and 5% by weight triethylamine. When this mixture is exposed to ultraviolet light, it changes from transparent to turbid to substantially reduce light transmission therethrough. Since external light directed toward the rear of the mirror is not transmited through this layer, the light intensity incident to the front of surface 262 is relatively greater than that behind to cause surface 262 to become reflective.

The ultraviolet light may be conducted uniformly over the chamber (as indicated by the arrows in FIG. 7) due to the use of plastic materials having good light conducting qualities. Arcuate surface 248 aids in this uniform light distribution through the plastic. An example of such a resin is polymethyl methacrylate. Many other plastic materials could also be used. Also, various structural and configurational variations may be made in the mirror shown to accommodate the particular application and type of energy source.

Another type of variable-opacity substance useful in the mirror illustrated in FIGS. 5 through 9 is that which is converted reversibly from the sol state to the gel state. These materials are usually responsive to temperature changes. Further, this type of substance may be used in a solid film state instead of a liquid contained in a chamber as previously described.

An example of the latter may be obtained by mixing a solution of (1) 10 parts of methylpolyvinyl ether, (2) 5 parts of an emulsifying agent such as glycololeate, salts of alkyl sulfonate, or neutral salts of derivatives of naphthalene sulfonic acid, and (3) 6 parts of agar-agar in 300 part of water. This mixture is poured in a thin layer on a flat support and dried to obtain a film having variable opacity qualities. It is then sandwiched between two suitable transparent layers such as glass or transparent plastic, or laminated to the glass layer 260 supporting the one-way mirror surface. Another example of a sol-gel reversible substance is an alkaline earth compound of polyacrylic acid in water, e.g. 1% mixture of magnesium polyacrylic in water. The temperature of the reversible change of each particular substance will depend upon other materials present. Color changing substances may be used here also as well as in the first embodiment. Thus, the above examples are illustrative only since materials experimented with presently and in the near future will probably be just as useful, if not more so, as a component in the inventive concept described.

THIRD EMBODIMENT

To produce a one-way mirror flexible in characteristics to adapt to both traffic and lighting conditions, the first two embodiments described can be combined to obtain a mirror which can be both alternately transparent and reflective (FIGS. 5-9) and which can enable control of a variable reflectivity brightness (FIGS. 1-4). The structure illustrated in FIG. 10 may be used. In this structure, a one-way reflector surface 300 is coated on the back of a glass sheet 302. Variable opacity layer 304 is sandwiched between glass sheets 306 and 308. Layer 304 is responsive to energy source 310 to become relatively opaque or transparent as explained with respect to FIG. 9. In front of surface 300 and sandwiched between glass plates 302 and 316, is layer 312 of a color-changing material. Layer 312 is responsive to energy source 314.

Layer 304 may be formed from the methylpolyvinyl ether composition described with respect to the apparatus of FIG. 9. Other substances may be used. Layer 312 may be formed of a dye substance as described with respect to the layer 24 in FIG. 2. The concentration of the dye must be calibrated to cause its response to a high intensity light 314 instead of automobile lights, etc. Suitable recesses 330 and 332 are provided in the two sandwiches in back of, and in front of reflective layer 300 to channel the light energy emitted from sources 310 and 314 down the respective sandwiches only. By utilizing independent controls over energy sources 310 and 314, not only may the mirror surface 300 be controlled between its transparent and reflective states, but also the glare or reflectivity brightness may be controlled simultaneously. Thus, on a dusky evening, layer 312 may be substantially colorless or a light color, for example, and layer 304 may be alternated between opaque and transparent, to allow alternate vision through the mirror, and to the rear. On a sunny day on the other hand, layer 312 may be darkened to a pink shade to reduce reflection glare, and may be alternated between a reflective position and a transparent position by control of layer 304.

Energy sources 310 and 314 may be ordinary intensified light sources, may be infra-red sources to activate a substance particularly responsive to such, may be ultraviolet sources to activate a material particularly responsive to ultraviolet wave lengths, may be radiant heat sources to cause temperature changes, may be conductive sources as illustrated in FIG. 4, or others. Also, each of these responsive layers may possess a converting material capable of absorbing light and converting it into heat to activate heat responsive material as explained previously.

It will be apparent to those in the art, that many possible combinations may be made with the mirror structures illustrated, such as the use of multiple color layers for color and opaqueness variations, or the use of particular substances to produce the color-changing or opaque-transparent effect, or the particular method of preparing the color-responsive or opaqueness responsive layer, and others. One example of such modifications is the coating of a mirror surface directly on the back of a thin layer of cast polymethylmethacrylate which includes uniformly dispersed therein a light-responsive substance inserted during its casting. Thus, the invention is not to be limited merely to the illustrative material, but only by the scope of the appended claims and the equivalents thereto.

We claim:
1. An optically variable mirror, comprising: a supported one-way mirror surface comprising a partially reflective coating on a transparent surface; said surface being generally transparent when the light intensity incident to one side thereof is greater than the light intensity incident to the opposite side, and said surface comprising a reflective mirror surface when the light intensity incident to said opposite side is greater than the light intensity incident to said one side; a first substance adjacent said one side; first means to apply a predetermined energy potential to said first substance; said first substance having an opacity variable with said energy potential applied thereto such that the characteristics of said surface may be altered between transparency and reflectivity; and a second substance adjacent said opposite side; second means to apply a predetermined type of energy potential to said second substance; said second substance being capable of color variations with the latter mentioned type of applied energy such that the reflectivity brightness from said surface may be varied.

2. An optically variable mirror, comprising: a supported one-way mirror surface comprising a partially reflective coating on a transparent surface; said surface being generally transparent when the light intensity incident to one side thereof is greater than the light intensity incident to the opposite side, and said surface comprising a reflective mirror surface when the light intensity incident to said opposite side is greater than the light intensity incident to said one side; a first substance adjacent said one side having an opacity variable with a type of energy potential applied thereto such that the characteristics of said surface may be altered between transparency and reflectivity; a second color variable substance adjacent said opposite side responsive to a type of energy potential applied thereto to change color, whereby the reflectivity brightness from said surface may be varied; and a variable energy source for each of said substances capable of providing said types of energy, whereby the reflectivity-transparency characteristics may be controlled independently of the reflectivity brightness.

References Cited by the Examiner
UNITED STATES PATENTS

| 2,710,274 | 6/1955 | Kuehl. | |
|---|---|---|---|
| 3,198,070 | 8/1965 | Platzer et al. | 88—77 |

References Cited by the Applicant
UNITED STATES PATENTS

| 1,776,496 | 9/1930 | Eiland. |
|---|---|---|
| 2,632,045 | 3/1953 | Sziklai. |
| 2,710,274 | 6/1955 | Kuehl. |
| 2,776,598 | 1/1957 | Dreyer. |
| 2,824,235 | 2/1958 | Hahn et al. |
| 3,000,262 | 8/1961 | Rabinow et al. |

FOREIGN PATENTS

| 737,765 | 9/1955 | Great Britain. |
|---|---|---|

JEWELL H. PEDERSEN, *Primary Examiner.*
JOHN K. CORBIN, *Examiner.*